United States Patent
Tanaka (10) Patent No.: US 9,747,065 B2
(45) Date of Patent: Aug. 29, 2017

(54) IMAGE FORMING APPARATUS AND RECORDING MEDIUM FOR PRINTING WITH EXECUTABLE PRINT SETTINGS

(71) Applicant: KONICA MINOLTA, INC., Chiyoda-ku, Tokyo (JP)

(72) Inventor: Kazuyoshi Tanaka, Hachioji (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/161,337

(22) Filed: May 23, 2016

(65) Prior Publication Data

US 2016/0364187 A1    Dec. 15, 2016

(30) Foreign Application Priority Data

Jun. 9, 2015   (JP) .................................. 2015-116683

(51) Int. Cl.
G06F 3/12    (2006.01)

(52) U.S. Cl.
CPC ............ *G06F 3/127* (2013.01); *G06F 3/1205* (2013.01); *G06F 3/1206* (2013.01); *G06F 3/1245* (2013.01); *G06F 3/1255* (2013.01); *G06F 3/1285* (2013.01)

(58) Field of Classification Search
None
See application file for complete search history.

(56) References Cited

U.S. PATENT DOCUMENTS

| | | | |
|---|---|---|---|
| 8,335,002 B2 | 12/2012 | Kawara | |
| 9,213,508 B2 | 12/2015 | Sueshige | |
| 2008/0100869 A1* | 5/2008 | Nagai | G06K 15/02 358/1.18 |
| 2012/0236357 A1* | 9/2012 | Cech | G06F 3/1288 358/1.15 |

FOREIGN PATENT DOCUMENTS

| | | |
|---|---|---|
| JP | 2004-046578 | 2/2004 |
| JP | 2008-112237 A | 5/2008 |
| JP | 2009-266094 | 11/2009 |
| JP | 2010-181932 | 8/2010 |
| JP | 2012-030449 | 2/2012 |
| JP | 2012-181762 | 9/2012 |

OTHER PUBLICATIONS

Notification of Reasons for Refusal issued in corresponding Japanese Patent Application No. 2015-116683, dated May 30, 2017, with English Translation (9 pages).

* cited by examiner

*Primary Examiner* — Andrew H Lam
(74) *Attorney, Agent, or Firm* — Buchanan Ingersoll & Rooney PC (57) ABSTRACT

An image forming apparatus of the present invention acquires information of printing setting that can be executed by a printing instruction apparatus, and then determines whether or not printing setting described in the printing setting information is executable in the printing instruction apparatus, on the basis of the acquisition result. Then, when determining that the printing setting is not executable, the image forming apparatus changes the contents of the printing setting in the printing setting information to printing setting suitable for the image forming apparatus.

8 Claims, 8 Drawing Sheets

| CUSTOMER ID | COLOR CONFIGURATION |
|---|---|
| 1 | JapanColor |
| 2 | GRACoL |
| 3 | ISOCoated |
| 4 | JMPAColor |

FIG. 10

IMAGE FORMING APPARATUS AND RECORDING MEDIUM FOR PRINTING WITH EXECUTABLE PRINT SETTINGS

BACKGROUND OF THE INVENTION

Field of the Invention

The present invention relates to an image forming apparatus and a computer-readable recording medium storing a program, and in particular, relates to an image forming apparatus which is used in a printing process management system constituted of a printing process management apparatus and a printing instruction apparatus and which performs printing upon receiving an printing instruction from the printing instruction apparatus, and a computer-readable recording medium storing a program used for the control of the image forming apparatus.

Description of the Related Art

In a printing flow using JDF (Job Definition Format) collaboration, printing and post-processing work is performed in a state of connecting a process management application referred to as an MIS (Management Information System), an imposition and plate-making application referred to as CTP (Computer To Plate)-WF (Workflow), an image forming apparatus, a post-processor, and the like.

The JDF corresponds to a printing instruction (written job instruction). The JDF describes job instruction information such as printing setting, customer information, and delivery time. The MIS instructs the CTP-WF to execute a job. Upon receiving the instruction, a CTP-WF operator allocates the job to the image forming apparatus and the post-processor to thereby cause the image forming apparatus and the post-processor to execute printing processing.

However, the CTP-WF has a poor printing setting function, and there is a case where the printing setting instructed by the MIS cannot be applied to the image forming apparatus. Furthermore, some of the CTP-WFs do not have a GUI (Graphical User Interface) for the printing setting, and cause a job template file describing the job setting to be selected at the time of job input. In this case, printing is performed only for printing setting stored as a preset setting.

Therefore, a hot folder is created on the side of the image forming apparatus, and operation of using the hot folder is performed as to a print item which cannot be set by the CTP-WF (refer to Japanese Patent Laid-Open No. 2008-112237, for example).

SUMMARY OF THE INVENTION

However, in the above technique, print work takes time because the hot folder needs to be separately created when the printing setting cannot be performed by the CTP-WF. Furthermore, a customer needs to grasp what kind of job setting item exists in each of the CTP-WF and the hot folder, and the management of the printing process becomes complicated.

The present invention has been achieved in view of the above situation, and an object of the present invention is to provide an image forming apparatus and a computer-readable recording medium storing a program, in which the creation of the hot folder is made unnecessary and thus print work can be smoothly performed and also the printing process can be easily managed.

In order to achieve at least one of the above object, an image forming apparatus reflecting one aspect of the present invention includes an acquisition portion configured to acquire information of printing setting that can be executed by a printing instruction apparatus that receives a written job instruction and a job execution instruction, from a printing process management apparatus which creates the written job instruction regarding an order-receiving job and which performs the job execution instruction; and a change portion configured to change contents of the printing setting in the written job instruction to a suitable written job instruction in a case where it is determined that the printing setting described in the written job instruction cannot be executed by the printing instruction apparatus, on the basis of an acquisition result of the acquisition portion, wherein the image forming apparatus is used in a printing process management system including the printing process management apparatus and the printing instruction apparatus, and performs printing upon receiving a printing instruction from the printing instruction apparatus.

Preferably, the above image forming apparatus further includes a database for complimenting the printing setting, wherein the change portion performs data search in the database on the basis of the written job instruction acquired from the printing instruction apparatus, and updates the written job instruction when detecting target data.

Preferably, in the above image forming apparatus, when data on the written job instruction changed by the change portion is received by the printing instruction apparatus, in a case where the received data is the same as preset data, the received data is discarded by the printing instruction apparatus, and in a case where a file format of the received data is not a written job instruction format, the file format of the received data is converted into the written job instruction format by the printing instruction apparatus.

DESCRIPTION OF THE PREFERRED EMBODIMENTS

Hereinafter, a mode for carrying out the present invention (hereinafter, described as "embodiment") will be explained in detail using the drawings. The present invention is not limited to the embodiment. Note that, in the following explanation and each of the drawings, the same symbol is attached to the same element or an element having the same function and duplicated explanation will be omitted.

<Printing Process Management System>

Figure 1:
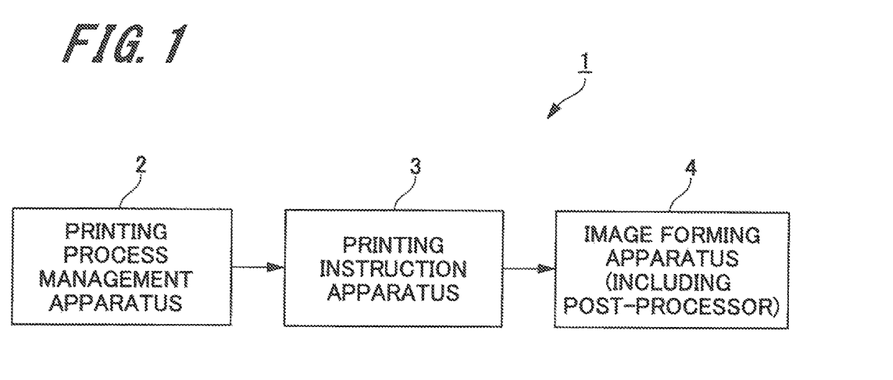
FIG. 1 is a block diagram illustrating a system configuration example of a printing process management system to which the present invention is applied.

FIG. 1 is a block diagram illustrating a system configuration example of a printing process management system to which the present invention is applied. As illustrated in FIG. 1, a printing process management system 1 according to a present application example (present embodiment) includes a printing process management apparatus 2, a printing instruction apparatus 3, and an image forming apparatus 4. The image forming apparatus 4 includes a post-processor in some cases. Then, an image forming apparatus of the present invention is used as the image forming apparatus 4 in the present printing process management system 1. That is, the image forming apparatus of the present invention is an image forming apparatus used in the printing process management system 1 having the above configuration. A printer such as a digital printer can be exemplified as the image forming apparatus of the present invention.

The printing process management apparatus 2 generates a job instruction about an order-receiving job, and instructs the printing instruction apparatus 3 to execute the job. In the present printing process management system 1, the printing process management apparatus 2 corresponds to a process management application referred to as an MIS. The printing instruction apparatus 3 receives the written job instruction and a job execution instruction from the printing process management apparatus 2, and performs printing instruction to the image forming apparatus 4. In the present printing process management system 1, the printing instruction apparatus 3 corresponds to an imposition and plate-making application referred to as a CTP-WF. The image forming apparatus 4 receives a printing instruction from the printing instruction apparatus 3 and then performs printing.

Figure 2:
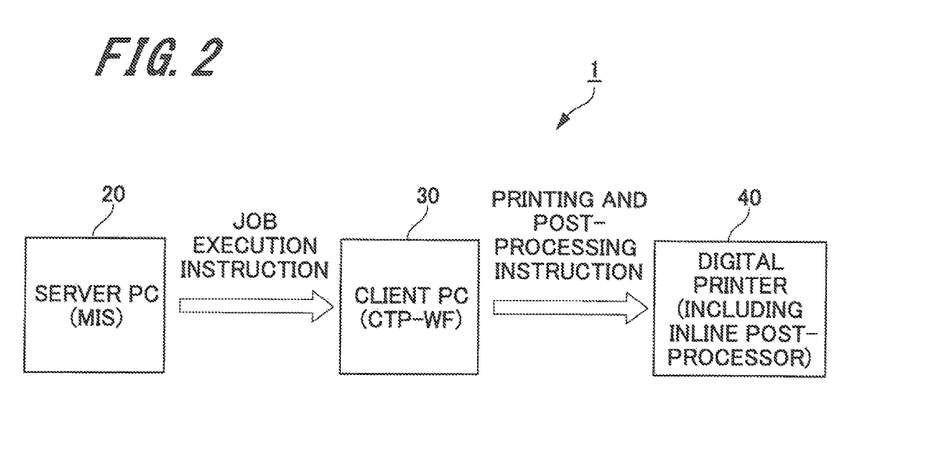
FIG. 2 is a block diagram illustrating a specific configuration example and a processing flow of a printing process management system to which the present invention is applied.

FIG. 2 is a block diagram illustrating a specific configuration example and a processing flow of the printing process management system 1 according to the present application example (present embodiment).

In the present printing process management system 1, the printing process management apparatus 2 is a server PC (Personal Computer) 20 in which the MIS application to manage a printing process is installed, and the configuration thereof is the same as that of a client PC 30 to be described below. The server PC 20 creates a written job instruction (JDF) that describes printing setting and customer information (customer name, delivery destination, delivery time, and the like) after receiving a print job order from a customer, and performs job execution instruction to the succeeding client PC 30. Furthermore, the server PC 20 also performs the management of a printing state and a progression status with respect to the delivery time.

In the present printing process management system 1, the printing instruction apparatus 3 is the client PC 30 in which the CTP-WF application is installed, and details of the configuration thereof will be described below. The CTP-WF is an application for performing unitary management of the printing process and the post-processing step, and printing and post-processing instruction. The client PC 30 performs job input to a digital printer 40 which is an example of the image forming apparatus 4 and the post-processor, and performs the confirmation of the progression status thereof, and the like.

When the client PC 30 receives a job instruction from the server PC 20, the operator of the client PC 30 (CTP-WF operator) performs job allocation to the digital printer 40 and the post-processor according to the instruction. Here, while the digital printer 40 is exemplified as the image forming apparatus 4, the image forming apparatus is not limited to the digital printer 40 and may be an offset printer or the like.

The digital printer 40 executes printing processing upon receiving the job input from the client PC 30. The digital printer 40 is suitable for comparatively small scale printing, and is used mainly for the case of small lot printing. Furthermore, the digital printer 40 is also used in a confirmation stage (proof) before large volume printing by an offset printer.

The digital printer 40 is broadly constituted of three modules of a printer controller, a printer engine, and an inline post-processor. The printer controller is an RIP (Raster Image Processor) module in the digital printer 40. The printer engine performs each image forming process such as image transfer, printing, and sheet ejection in the digital printer 40. The inline post-processor is a post-processor directly connected to the digital printer 40, and performs post-processing such as stapling and punching on a sheet after printing by the digital printer 40 on the spot.

Incidentally, the printing process in the JDF collaboration generally includes a printing process carried out in a case where a CTP (plate-making apparatus for an offset printer), an offset printer, a near-line post-processor, and an off-line post-processor are included in the configuration.

<Hard Ware Configurations of the Client PC and the Digital Printer>

Figure 3:
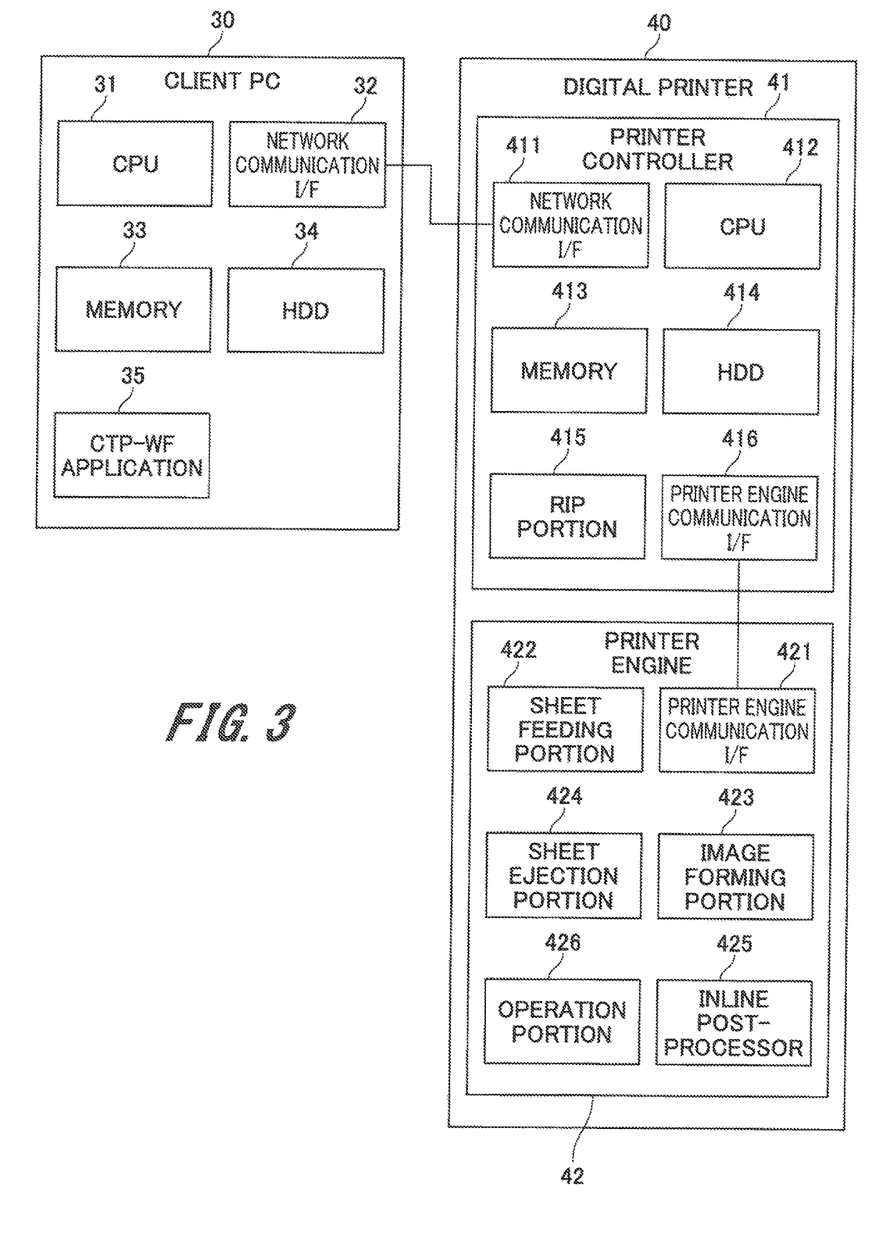
FIG. 3 is a block diagram illustrating an example of hardware configuration of a client PC and a digital printer.

FIG. 3 is a block diagram illustrating hardware configuration examples of the client PC 30 and the digital printer 40.

[Client PC]

As illustrated in FIG. 3, the client PC 30 is constituted of a CPU (Central Processing Unit) 31, a network communication interface (I/F) 32, a memory 33, an HDD (Hard Disk Drive) 34, and the like, and the above CTP-WF application 35 is installed therein. Printing data generated by the CTP-WF application 35 is transmitted to the printer controller 41 in the digital printer 40 via the network communication interface 32.

[Digital Printer]

The digital printer 40 is divided into a printer controller 41 and a printer engine 42.

(Printer Controller)

The printer controller 41 is constituted of a network communication interface 411, a CPU 412, a memory 413, an HDD 414, an RIP unit 415, a printer engine communication interface 416, and the like. The HDD 414 is a module that stores image data and setting information of a job to be stored.

The printer controller 41 receives the printing data transmitted from the client PC 30 via the network communication interface 411, and performs rasterizing processing in the RIP unit 415 (the CPU 412 processes and executes data developed on the memory 413). After the completion of the rasterizing processing, the image data and post-processing setting data are transmitted to the printer engine 42 via the printer engine communication interface 416.

(Printer Engine)

The printer engine 42 is constituted of a printer engine communication interface 421, a sheet feeding portion 422, an image forming portion 423, a sheet ejection portion 424, an inline post-processor 425, an operation portion 426, and the like, and prints, on a sheet, the image data received from the printer controller 41. Furthermore, the inline post-processor 425 can perform post-processing such as stapling and punching on the sheet after printing.

<Regarding Data Communication in the JDF Collaboration>

Generally, in the collaboration of the MIS and the CTP-WF, data communication is performed by a standard referred to as JDF. The JDF is an industry common standard, and enables the data communication among different venders. Accordingly, it is possible to cause CTP-WFs and image forming apparatuses from different development sources to collaborate, and it is possible to perform the execution of printing and post-processing and the management of the printing process by referring to the printing instruction, the job state information, and the like having a common format described in the JDF (written job instruction).

<Processing in the Client PC and the Digital Printer>

Hereinafter, the processing flows in the client PC (CTP-WF) 30 and the printer controller 41 of the digital printer 40 will be explained. The digital printer 40 is an example of the image forming apparatus according to an embodiment of the present invention. In the following, while communication example using the JDF and a JMF (Job Messaging Format) will be explained as an example, the communication is not necessarily limited to the method.

[Information Acquisition of the Printing Setting Function which can be Executed by the Client PC]

The printer controller 41 acquires information of a function for which printing setting can be performed from The client PC (CTP-WF) 30 at the time of initial connection with the printer controller 41, and holds the acquired information. Specifically, as illustrated in the flowchart in FIG. 4, when the client PC 30 is connected with the printer controller 41, the client PC 30 transmits an initial communication message to the printer controller 41. This is a notification for a request of acquiring a state on the side of the digital printer 40 (sheet tray information, sheet list information, inline post-processor configuration information, and the like).

Figure 4:
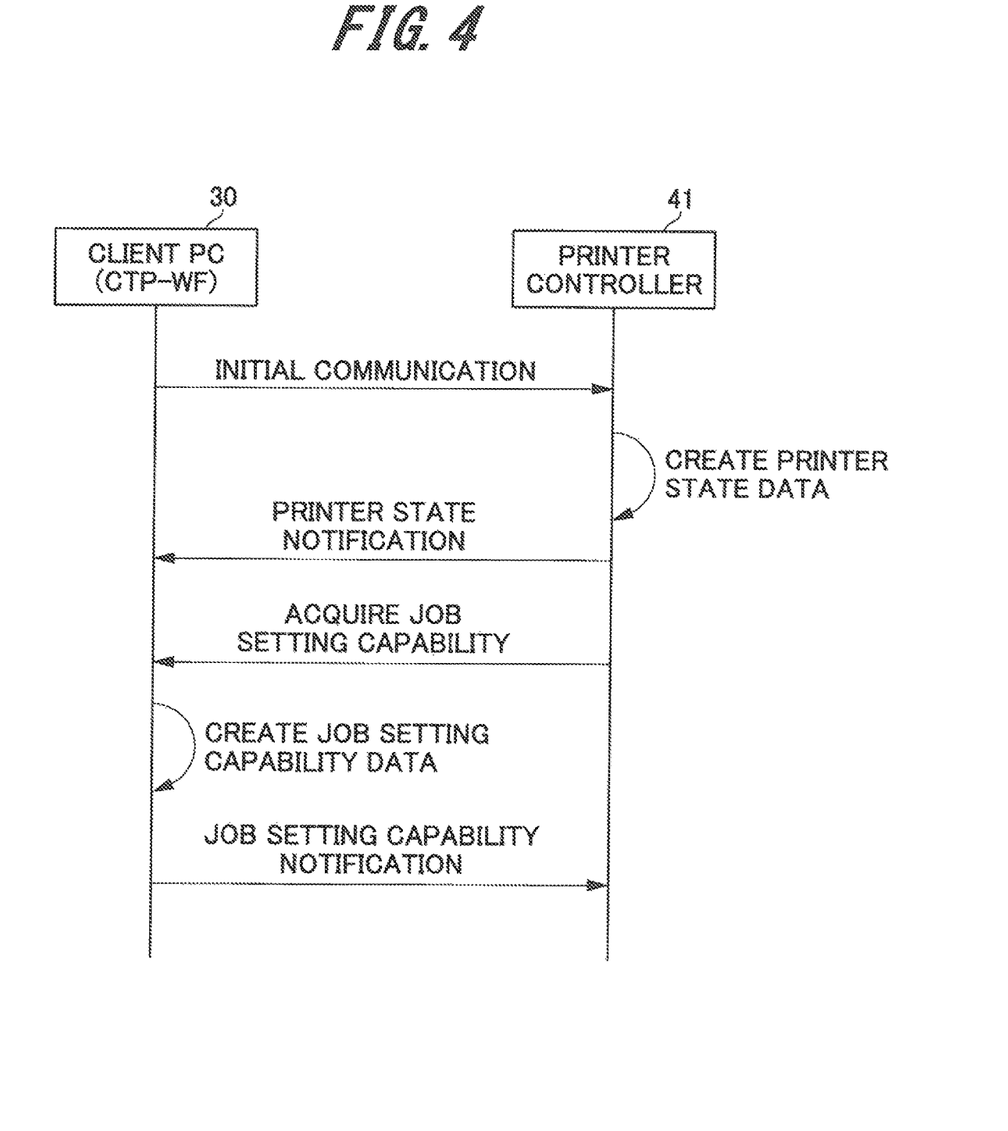
FIG. 4 is a flowchart illustrating a processing flow for acquiring information of a printing setting function which can be executed by CTP-WF.

The printer controller 41 creates data for responding to the request and gives a response notification to the client PC 30, and further performs the request of acquiring a job setting capability to the client PC 30. In these request and response for the state acquiring, data communication using an XML (Extensible Markup Language) format referred to as the JMF is performed. The request of acquiring the job setting capability from the printer controller 41 to the client PC 30 and the response thereto can also be realized by utilization of the JMF.

Example

By using a JMF message referred to as JMF Known Devices which is a notification of the executable printing setting on the side of the digital printer 40, the digital printer 40 can notify the client PC 30 of the printing setting which can be executed by the digital printer 40. For example, in the case of stapling setting, a JMF notification sent from the printer controller 41 to the client PC 30 has description as follows. <Name="StitchingParams"><EnumerationState AllowedValueList="Corner Side"/><Name/>

This means "corner stapling and side stapling are possible in the printer".

The same format may be used for data generation of the job setting capability in the client PC 30, and the printer controller 41 can know what kind of printing setting is possible in the client PC 30 (i.e., printing instruction apparatus 3) by analyzing the data with the printer controller 41.

[State Monitoring of the Client PC and JDF Acquisition]

Figure 5:
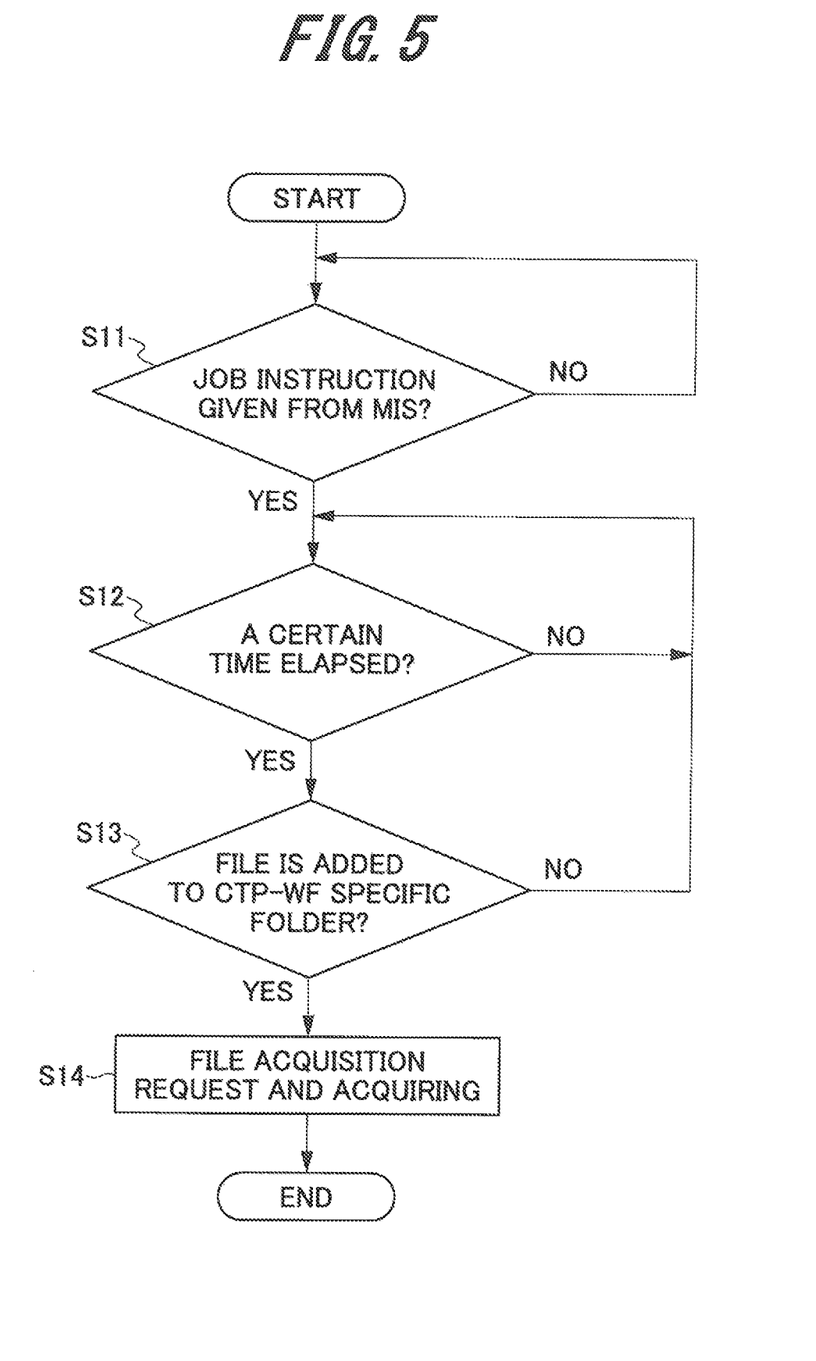
FIG. 5 is a flowchart illustrating an example of processing procedures of client PC state monitoring and JDF acquisition.

Next, monitoring of the state in the client PC (CTP-WF) 30 and acquisition processing of the JDF (written job instruction) will be explained using the flowchart in FIG. 5.

The printer controller 41 performs monitoring of the client PC 30, and detects whether or not the client PC (CTP-WF) 30 receives the job execution instruction, from the server PC (MIS) 20 that is the printing process management apparatus 2 (step S11). The job execution instruction from the server PC 20 is performed by the transmission of the JDF (written job instruction).

The storage destination of the JDF which the client PC 30 receives from the server PC 20 is confirmed at a certain time interval from the printer controller 41 (step S12). Next, in a case where the JDF is newly stored in the storage destination (a file is added to a specific folder), the printer controller 41 detects that the client PC 30 receives the job instruction from the server PC 20 (step S13). Then, in a case where it is detected that the client PC 30 has received the job instruction by the server PC 20, the printer controller 41 performs the JDF acquisition request and acquires the JDF, from the client PC 30 (step S14).

[Determination Whether or not Printing Setting is Possible in the Client PC, and Storage of a Job Template]

Next, determination whether or not printing setting is possible in the client PC (CTP-WF) 30 and storage processing of a job template will be explained.

Figure 6:
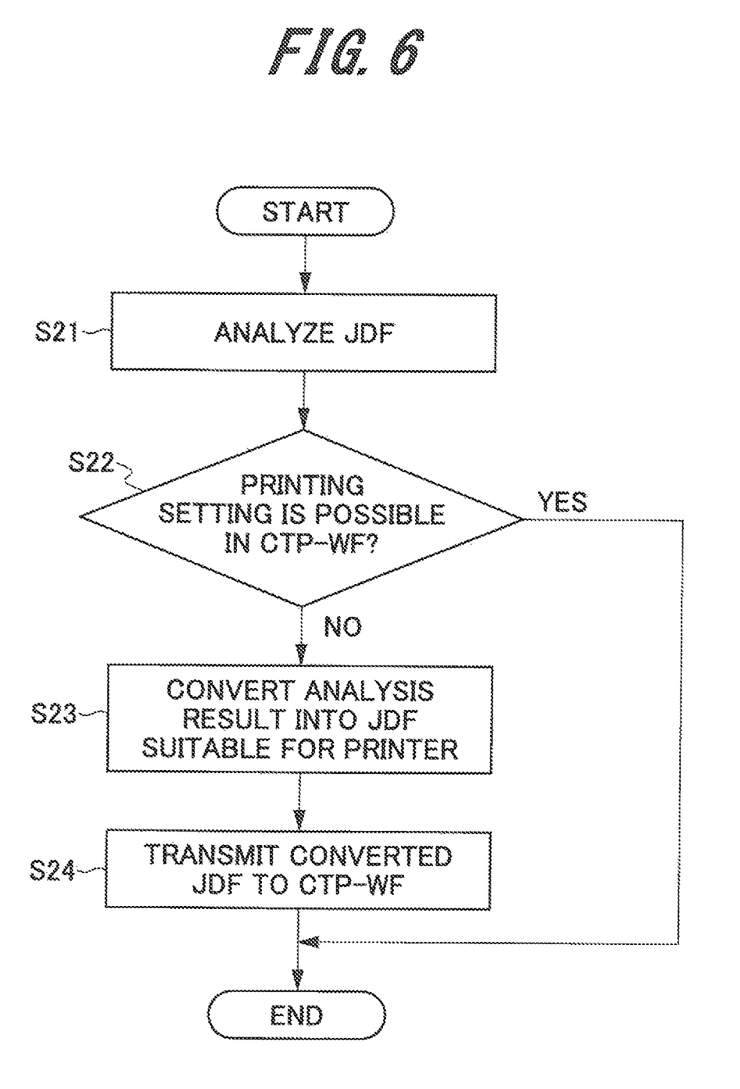
FIG. 6 is a flowchart illustrating an example of processing procedures of a printer controller after acquiring a JDF from a client PC.

First, processing in the printer controller 41 after acquiring the JDF from the client PC 30 will be explained using the flowchart in FIG. 6. The processing is executed in the printer controller 41 illustrated in FIG. 3 under the control of the CPU 412.

In the printer controller 41, the CPU 412 analyzes the JDF acquired from the client PC 30 (step S21). BY the analysis, the CPU 412 grasps what kind of printing setting is described in the JDF. Subsequently, the CPU 412 compares the JDF analysis result with the job setting capability which has been acquired at the time of initial connection with the client PC 30, and determines whether or not the printing setting described in the JDF can be set in the client PC (CTP-WF) 30 (step S22).

Here, in the example of stapling setting, the CPU 412 may perform comparison between the above described JMF parameters. For example, in the following case;

JDF description: <EnumerationState AllowedValueList="Corner"/>-CTP-WF setting capability: <EnumerationState AllowedValueList="Corner Side"/>, the corner stapling and the side stapling can be set in the client PC 30 and the determination result is that the corner stapling described in the JDF can be set on the CTP-WF.

The CPU 412 terminates the present processing when the determination result in step S22 is that the setting is possible on the CTP-WF" (Yes in S22). In this case, the operator of the client PC 30 (CTP-WF operator) may perform the printing setting on the application and input the job into the digital printer 40.

When the determination result in step S22 is that the setting is not possible on the CTP-WF (No in S22), the CPU 412 converts (changes) the received JDF into a JDF for the printer, that is, a JDF suitable for the digital printer 40 (step S23). The reason of the conversion is as follows. That is, although the JDF is a standard specification, there exists a case where the interpretation method (description method of various kinds of parameter, or the like) is different depending on a vender. In the case where the received JDF can be utilized as it is, the conversion (change) of the JDF is not necessary. Finally, the CPU 412 transmits the converted JDF (printing setting information) to the client PC 30 (step S24).

Figure 7:
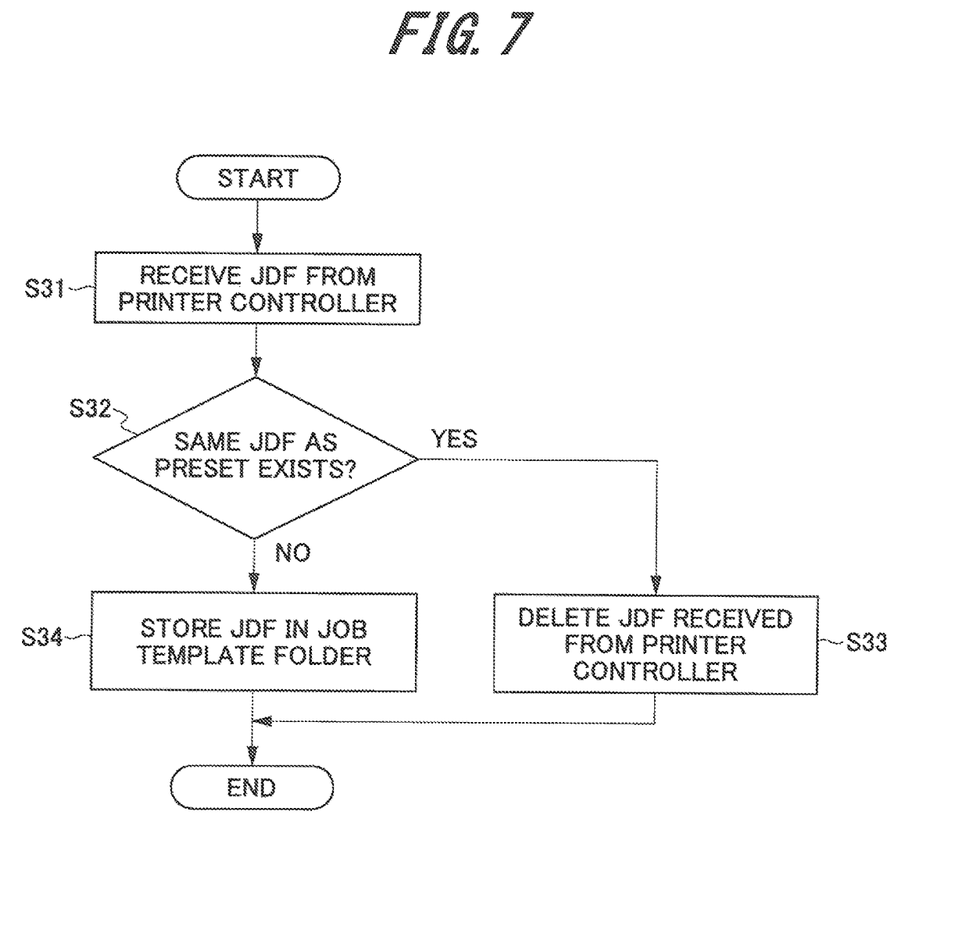
FIG. 7 is a flowchart illustrating an example of processing procedures of a client PC after acquiring a converted JDF from a printer controller.

Subsequently, the processing of the client PC 30 after acquiring the converted (changed) JDF from the printer controller 41 will be explained using the flowchart in FIG. 7. The processing is executed in the client PC 30 illustrated in FIG. 3 under the control of the CPU 31.

In the client PC 30, the CPU 31 receives the converted JDF transmitted from the printer controller 41 (step S31), and then compares the received converted JDF with the JDF job template stored as a preset (step S32). Then, in a case where the setting contents of the received converted JDF and the setting contents of the JDF job template are the same as each other as a result of the comparison (Yes in S32), the received converted JDF becomes unnecessary and is deleted by the CPU 31 (step S33). Furthermore, when the setting contents of the received JDF and the setting contents of the preset template do not coincide with each other as a result of the comparison (No in S32), the CPU 31 stores the received converted JDF in the CTP-WF as a preset template file (job template file) (step S34).

In other words, the CPU 31, when receiving the data regarding the converted JDF transmitted from the printer controller 41, performs processing of discarding the received data in a case where the received data is the same as the preset data (preset template). Moreover, the CPU 31 performs processing of converting the file format of the received data into the JDF format in a case where the file format of the received data is not the JDF (written job instruction) format (that is, the setting contents do not coincide with that of the preset template).

[Regarding Operation of the CTP-WF Template]

Here, the operation of the CTP-WF template will be explained. The client PC (CTP-WF) 30, although mounting a GUI that performs the printing setting in the same way as a printer driver or the like, generally does not have many items capable of printing setting. While a variety of inline post-processing such as case-binding, ring-binding, and various kinds of folding is possible on the side of the digital printer 40, many client PC 30 can perform only basic setting such as stapling and punching. Furthermore, there also exists a client PC 30 without mounting a GUI for printing setting.

Figure 8:
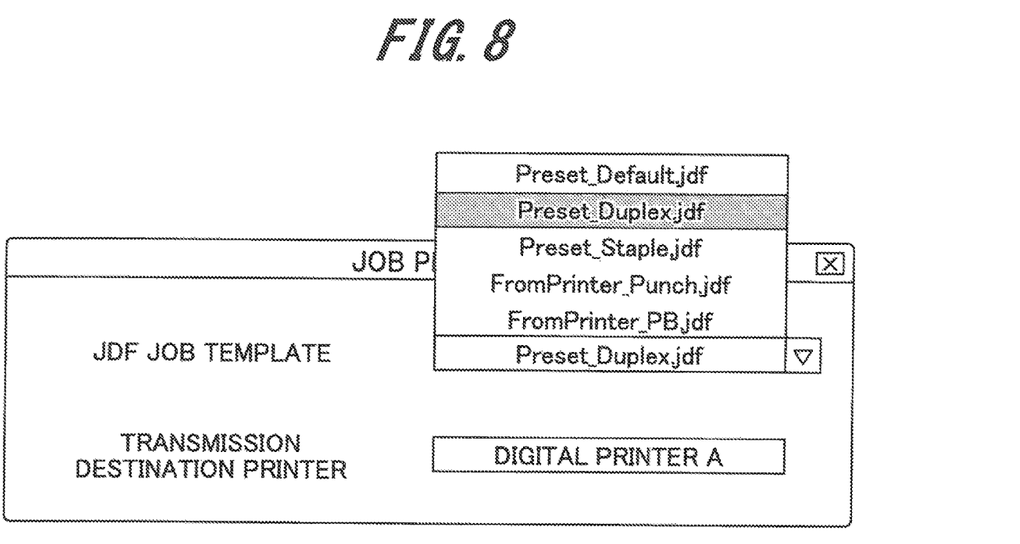
FIG. 8 is a diagram illustrating an example of a template selection image in a client PC (CTP-WF).

In such a case, the JDF describing the printing setting which can be executed on the side of the digital printer 40 is preliminarily stored in the client PC 30, and the operation of the job template is performed so as to cause the JDF to be selected when the client PC 30 gives a printing instruction to the digital printer 40. Accordingly, even if the client PC 30 cannot set the case-binding, the instruction of the case-binding can be performed at the time of printing by preliminarily storing, in the client PC 30, the JDF in which the case-binding has been set. FIG. 8 illustrates an example of a template selection image in the client PC (CTP-WF) 30.

[JDF Correction]

As described above, the printer controller 41 acquires, from the client PC 30, the JDF transmitted from the server PC 20 to the client PC 30. Although the JDF generated by the server PC (MIS) also includes various management parameters (customer information, delivery destination, delivery time, and the like) other than the printing setting, the printer controller 41 normally neglects these parameters since these are not parameters directly involved in the printing in digital printer 40.

The printer controller 41 can reflect the above management parameters to the printing setting at the time of the above-described analysis in the printer controller 41. Color conversion setting for each customer will be explained as an example. The printing is desired to be performed by applying appropriate color setting depending on an ordering customer or a delivery destination (enterprise and country) of a printed matter. Examples include GRACoL (registered trade mark) of a standard for commercial sheet-fed printing, JMPA (color target of the Magazine Publishers' Association) color in the Japanese advertising industry (magazine publishing or the like), a color configuration certificated by Fogra for a print for Europe, and the like.

Figure 9:
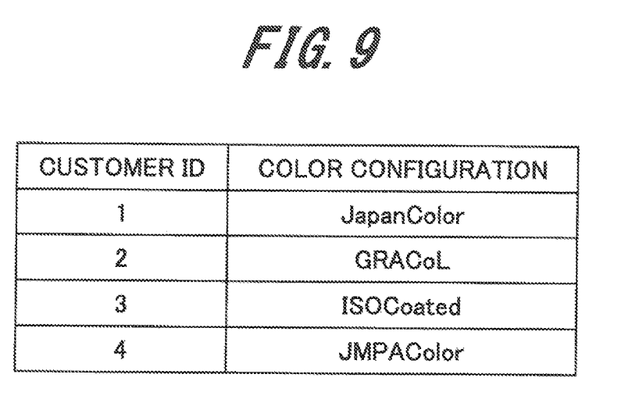
FIG. 9 is a diagram illustrating an example of association table of customer information and color configuration.

For a method of realizing the reflection of the above management parameter to the printing setting, a table obtained by associating the customer information with color configuration setting owned by the printer controller 41 is preliminarily created, and the created association table is stored at a specific location as a database for complementing the printing setting. The storage destination (specific location) of the association table may be the HDD 414 in the printer controller 41 (refer to FIG. 3), or may be an external server or the like. FIG. 9 illustrates an example of the association table of the customer information and the color configuration.

Here, correction processing of the color configuration setting executed in the printer controller 41 will be explained using the flowchart in FIG. 10. The operation of the printer controller 41 may be operation in which determination processing whether or not the customer information exists is added to the above JDF analysis processing of the printer controller 41. That is, the correction processing of the color configuration setting is processing performed in the JDF analysis in step S21 of FIG. 6.

In the printer controller 41, the CPU 412 analyzes the JDF acquired from the client PC 30 (step S211). The CPU 412 grasps, by the analysis, what kind of printer setting is described in the JDF. Subsequently, the CPU 412 determines whether or not the customer information exists in the JDF (step S212).

Figure 10:
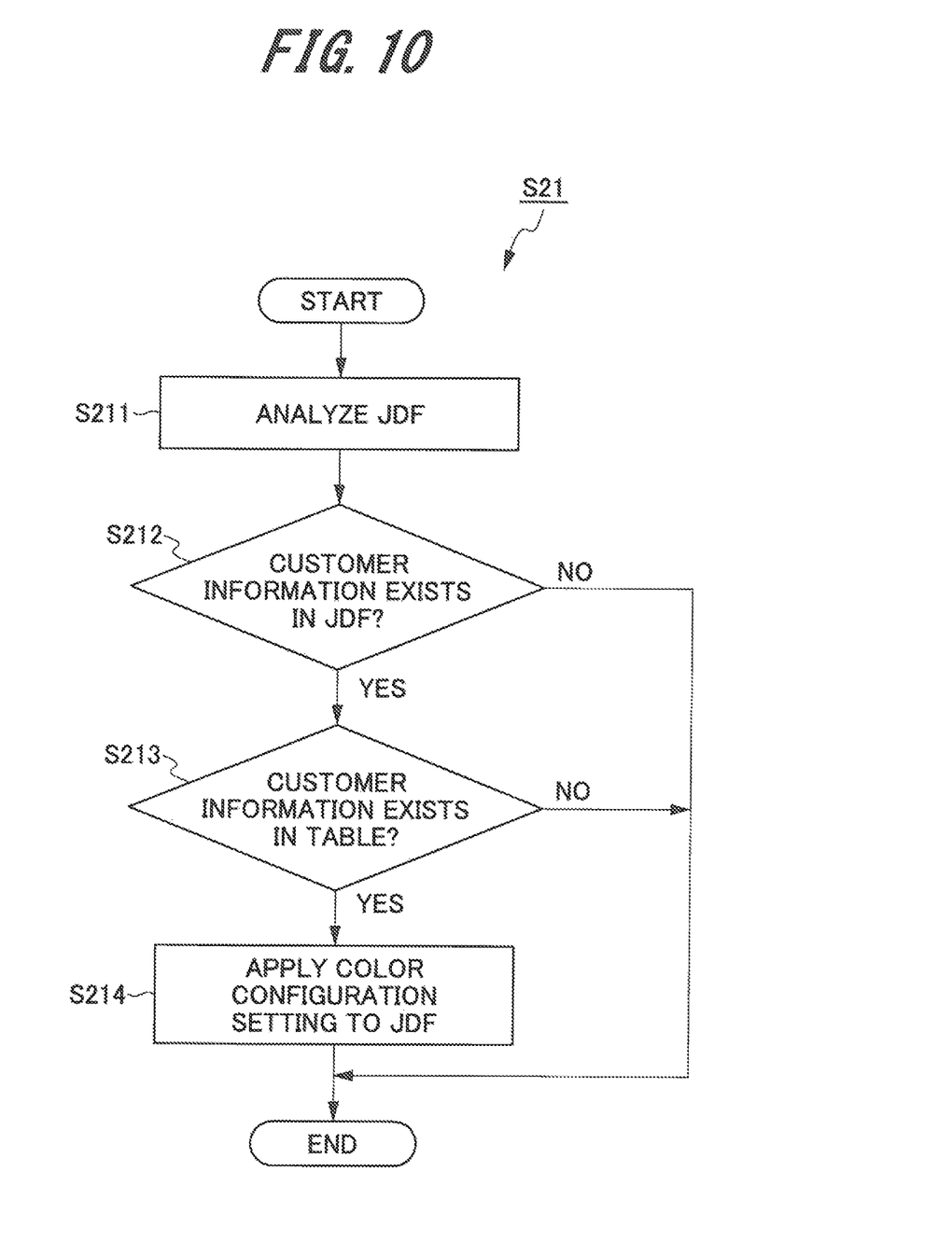
FIG. 10 is a flowchart illustrating an example of correction processing of color configuration setting.

Next, the CPU 412 accesses the association table (database) of FIG. 10 when the customer information is determined to exist in the JDF (Yes in S212), and determines whether or not the customer information is registered in the association table, that is, whether or not the customer information exists in the association table (database) (step S213). Then, the CPU 412 acquires the color configuration information associated with the customer information if the customer information has been registered (Yes in S213), and applies the information to the JDF, that is, the JDF is updated (step S214).

That is, the CPU 412 accesses the association table that is the database and performs data search on the basis of the JDF acquired from the client PC 30, and updates the JDF when detecting the customer information of the target data. When the customer information is determined not to exist in step S212 (No), and when the customer information is determined not to exist in the association table in step S213 (No), the present processing is terminated at this point.

[Program]

The above various processing of the printer controller 41 is executed by an instruction of a program to the CPU 412 which is an example of a computer. The processing program causing the CPU 412 to execute the various processing of the printer controller (program of the present invention) is considered to be preliminarily installed in the memory 413 of the printer controller 41 (refer to FIG. 3). However, the present invention is not limited to this, and the program of the present invention can also be provided by wired or wireless communication means, and the program of the present invention can also be stored in a computer-readable recording medium such as an IC card and a USB memory to thereby be provided.

As explained above, the digital printer 40 according to the present embodiment which is used in the printing process management system 1 including the server PC (MIS) 20 and the client PC (CTP-WF) 30 adopts the following configuration for making the creation of the hot folder unnecessary. First, the digital printer 40 has a function of an acquisition portion that acquires the information of the printing setting (JDF) which can be executed by the client PC 30. The processing of the acquisition portion that acquires the information of the printing setting executable by the CTP-WF is executed in step S14 of FIG. 5.

Furthermore, the digital printer 40 according to the present embodiment has a function of an interpretation portion that interprets the acquired printing setting information (JDF), and a function of a determination portion that determines on the basis of the analysis result whether or not the printing setting described in the JDF received from the server PC 20 can be executed by the client PC 30. The processing in the interpretation portion is executed in step S21 of FIG. 6. The processing of the determination portion is executed in step S22 of FIG. 6.

Moreover, in a case where the printing setting of the JDF cannot be executed by the client PC 30 as the determination result (No in S22), the digital printer 40 according to the present embodiment has a function of a change portion that changes (convert) the contents of the printing setting in the JDF to the printing setting (JDF) suitable for itself (digital printer 40). The processing of the change portion that changes the printing setting of the JDF is executed in step S23 of FIG. 6.

When the server PC (MIS) 20 instructs the client PC (CTP-WF) 30 to execute the job, it is possible to automatically create the job template file by the above processing of the digital printer 40, in the case where the instruction contents (printing setting) thereof cannot be set by the CTP-WF. Accordingly, a customer does not need the operation of the hot folder, and may handle only the CTP-WF. Therefore, the customer needs not perform work for separately creating the hot folder and also needs not grasp what job setting item exists in each of the CTP-WF and the hot folder, and thus the customer can smoothly perform the printing work. Furthermore, it is possible to know a list of settable printing setting on the CTP-WF and to unitarily manage the printing setting on the CTP-WF, and thus the management of the printing process becomes easy.

<Modification>

Although, hereinabove, the present invention has been explained using the embodiment, the present invention is not limited to the scope described in the above embodiment. That is, various modifications or improvements can be added to the above embodiment without departing from the gist of the present invention, and modes in which such modifications or improvements are added is included in the technical scope of the present invention. For example, although the communication using the JDF and the JMF has been explained as an example in the above embodiment, the present invention is not necessarily limited to the method, and may adopt a method using, for example, an MIB (Management Information Base) table.

Furthermore, although, in the above embodiment, each of the functional portions of the acquisition portion, the interpretation portion, the determination portion, and the change portion of the printer controller 41 is assumed to be realized by software by the CPU 412 interpreting and executing a program that realizes each of the functions, the present invention is not limited to this. That is, each of the above functional portions can also be realized using hardware through design or the like of a part or the whole thereof by using, for example, an integrated circuit.

What is claimed is:

1. An image forming apparatus comprising:
    a hardware processor configured to:
        acquire information of printing setting that can be executed by a printing instruction apparatus, the printing instruction apparatus receiving a written job instruction and a job execution instruction from a printing process management apparatus which creates the written job instruction regarding an order-receiving job and which performs the job execution instruction;
        determine whether the printing instruction apparatus can execute the written job instruction based the information of the printing setting acquired by the hardware processor; and
        change contents of the printing setting in the written job instruction to a written job instruction suitable for the image forming apparatus when the hardware processor determines that the printing setting described in the written job instruction cannot be executed by the printing instruction apparatus, wherein
    the image forming apparatus is used in a printing process management system including the printing process management apparatus and the printing instruction apparatus, and the image forming apparatus performing printing upon receiving a printing instruction from the printing instruction apparatus.

2. The image forming apparatus according to claim 1, further comprising:
    a database for complimenting the printing setting, wherein
    the hardware processor performs data search in the database on the basis of the written job instruction acquired from the printing instruction apparatus, and updates the written job instruction when detecting target data.

3. The image forming apparatus according to claim 1, wherein,
    when data on the written job instruction changed by the hardware processor is received by the printing instruction apparatus,
        in a case where the received data is the same as preset data, the received data is discarded by the printing instruction apparatus, and
        in a case where a file format of the received data is not a written job instruction format, the file format of the received data is converted into the written job instruction format by the printing instruction apparatus.

4. The image forming apparatus according to claim 1, further comprising:
    a printer engine that prints a print job when the image forming apparatus receives the printing instruction from the printing instruction apparatus.

5. A non-transitory computer-readable recording medium storing a program that causes a computer to execute processing steps comprising:
    acquisition processing of acquiring information of printing setting that can be executed by a printing instruction apparatus, in an image forming apparatus which is used in a printing process management system including a printing process management apparatus which creates a written job instruction regarding an order-receiving job and which performs a job execution instruction and the printing instruction apparatus receiving the written job instruction and the job execution instruction from the printing process management apparatus, and the image forming apparatus printing upon receiving a printing instruction from the printing instruction apparatus;

determining whether the printing instruction apparatus can execute the written job instruction based on the acquired information of the printing setting; and change processing of changing contents of the printing setting in the written job instruction to a written job instruction suitable for the image forming apparatus in a case where it is determined that the printing setting described in the written job instruction cannot be executed by the printing instruction apparatus.

6. The non-transitory recording medium according to claim 5, wherein the change processing performs data search in a database for complimenting the printing setting on the basis of the written job instruction acquired from the printing instruction apparatus, and updates the written job instruction in a case of detecting target data.

7. The non-transitory recording medium according to claim 5, wherein, when data on the written job instruction changed by the change portion is received by the printing instruction apparatus, in a case where the received data is the same as preset data, the received data is discarded by the printing instruction apparatus, and in a case where a file format of the received data is not a written job instruction format, the file format of the received data is converted into the written job instruction format by the printing instruction apparatus.

8. The non-transitory computer readable medium according to claim 5, wherein the image forming apparatus comprises a printer engine that prints a print job when the image forming apparatus receives the printing instruction from the printing instruction apparatus.

* * * * *